US010646832B2

(12) United States Patent
Liu et al.

(10) Patent No.: US 10,646,832 B2
(45) Date of Patent: May 12, 2020

(54) HIGH SELECTIVITY COPOLYIMIDE MEMBRANES FOR SEPARATIONS

(71) Applicant: UOP LLC, Des Plaines, IL (US)

(72) Inventors: Chunqing Liu, Arlington Heights, IL (US); Sudipto Chakraborty, Gurgaon (IN); Nicole Karns, Chicago, IL (US)

( * ) Notice: Subject to any disclaimer, the term of this patent is extended or adjusted under 35 U.S.C. 154(b) by 186 days.

(21) Appl. No.: 15/796,721

(22) Filed: Oct. 27, 2017

(65) Prior Publication Data
US 2018/0050309 A1 Feb. 22, 2018

Related U.S. Application Data

(63) Continuation of application No. PCT/US2016/060333, filed on Nov. 3, 2016.
(Continued)

(51) Int. Cl.
| | |
|---|---|
| *B01D 71/64* | (2006.01) |
| *B01D 53/22* | (2006.01) |
| *B01D 71/68* | (2006.01) |
| *B01D 69/02* | (2006.01) |
| *B01D 71/76* | (2006.01) |
| *B01D 67/00* | (2006.01) |
| *C08G 73/10* | (2006.01) |
| *B01D 61/36* | (2006.01) |
| *C02F 1/44* | (2006.01) |
| *C08L 79/08* | (2006.01) |
| *C10G 31/00* | (2006.01) |
| *C10L 1/06* | (2006.01) |
| *C10L 1/08* | (2006.01) |
| *C02F 101/30* | (2006.01) |

(52) U.S. Cl.
CPC ............ *B01D 71/64* (2013.01); *B01D 53/22* (2013.01); *B01D 53/228* (2013.01); *B01D 61/362* (2013.01); *B01D 67/0009* (2013.01); *B01D 67/0013* (2013.01); *B01D 67/0067* (2013.01); *B01D 69/02* (2013.01); *B01D 71/68* (2013.01); *B01D 71/76* (2013.01); *C02F 1/448* (2013.01); *C08G 73/1042* (2013.01); *C08G 73/1064* (2013.01); *C08G 73/1067* (2013.01); *C08L 79/08* (2013.01); *C10G 31/00* (2013.01); *C10L 1/06* (2013.01); *C10L 1/08* (2013.01); *B01D 67/0093* (2013.01); *B01D 2256/10* (2013.01); *B01D 2256/12* (2013.01); *B01D 2256/16* (2013.01); *B01D 2256/22* (2013.01); *B01D 2256/245* (2013.01); *B01D 2257/102* (2013.01); *B01D 2257/104* (2013.01); *B01D 2257/108* (2013.01); *B01D 2257/11* (2013.01); *B01D 2257/304* (2013.01); *B01D 2257/406* (2013.01); *B01D 2257/504* (2013.01); *B01D 2257/708* (2013.01); *B01D 2257/7025* (2013.01); *B01D 2257/80* (2013.01); *B01D 2258/06* (2013.01); *B01D 2323/30* (2013.01); *B01D 2323/345* (2013.01); *B01D 2325/20* (2013.01); *C02F 2101/30* (2013.01); *C10G 2300/1044* (2013.01); *C10G 2300/207* (2013.01); *C10L 2200/0423* (2013.01); *C10L 2200/0446* (2013.01); *C10L 2290/548* (2013.01); *Y02C 10/10* (2013.01); *Y02C 20/20* (2013.01)

(58) Field of Classification Search
CPC .... B01D 53/22; B01D 53/228; B01D 61/362; B01D 71/64; B01D 71/68; C08G 73/1042; C08G 73/1064; C08G 73/1067; C02F 1/448
See application file for complete search history.

(56) References Cited

U.S. PATENT DOCUMENTS

| | | | |
|---|---|---|---|
| 5,608,014 A | * 3/1997 | Ekiner | ................... B01D 71/64 525/432 |
| 6,932,589 B2 | 8/2005 | Suzuki | |
| | (Continued) | | |

OTHER PUBLICATIONS

Search Report dated Feb. 16, 2017 for corresponding PCT Appl. No. PCT/US2016/060333.

*Primary Examiner* — Jason M Greene

(57) ABSTRACT

The present invention discloses high selectivity copolyimide membranes for gas, vapor, and liquid separations. Gas permeation tests on these copolyimide membranes demonstrated that they not only showed high selectivity for $CO_2/CH_4$ separation, but also showed extremely high selectivities for $H_2/CH_4$ and $He/CH_4$ separations. These copolyimide membranes can be used for a wide range of gas, vapor, and liquid separations such as separations of $CO_2/CH_4$, $He/CH_4$, $CO_2/N_2$, olefin/paraffin separations (e.g. propylene/propane separation), $H_2/CH_4$, $He/CH_4$, $O_2/N_2$, iso/normal paraffins, polar molecules such as $H_2O$, $H_2S$, and $NH_3$ mixtures with $CH_4$, $N_2$, $H_2$. The high selectivity copolyimide membranes have UV cross-linkable sulfonyl functional groups and can be used for the preparation of UV cross-linked high selectivity copolyimide membranes with enhanced selectivities. The invention also includes blend polymer membranes comprising the high selectivity copolyimide and polyethersulfone. The blend polymer membranes comprising the high selectivity copolyimide and polyethersulfone can be further UV cross-linked under UV radiation.

21 Claims, No Drawings

Related U.S. Application Data

(60) Provisional application No. 62/257,827, filed on Nov. 20, 2015.

(56) References Cited

U.S. PATENT DOCUMENTS

| | | | |
|---|---|---|---|
| 7,048,846 B2 | 5/2006 | White et al. | |
| 7,485,173 B1 | 2/2009 | Liu et al. | |
| 8,337,598 B2 | 12/2012 | Yates et al. | |
| 8,366,804 B2 | 2/2013 | Liu et al. | |
| 8,614,288 B2 | 12/2013 | Liu et al. | |
| 8,704,030 B2 | 4/2014 | Liu et al. | |
| 8,710,173 B2 | 4/2014 | Liu et al. | |
| 2005/0268783 A1 | 12/2005 | Koros et al. | |
| 2010/0243567 A1* | 9/2010 | Liu | B01D 71/64 210/640 |
| 2010/0269698 A1* | 10/2010 | Yates | B01D 71/64 96/10 |
| 2015/0005468 A1* | 1/2015 | Osman | B01D 71/64 528/170 |
| 2015/0328594 A1* | 11/2015 | Liskey | B01D 71/64 528/337 |
| 2016/0151738 A1* | 6/2016 | Kulkarni | B01D 71/64 95/45 |
| 2016/0303521 A1* | 10/2016 | Chakraborty | B01D 71/64 |

\* cited by examiner

HIGH SELECTIVITY COPOLYIMIDE MEMBRANES FOR SEPARATIONS

CROSS-REFERENCE TO RELATED APPLICATIONS

This application is a Continuation of copending International Application No. PCT/US2016/060333 filed Nov. 3, 2016 which application claims benefit of U.S. Provisional Application No. 62/257,827 filed Nov. 20, 2015, the contents of which cited applications are hereby incorporated by reference in their entirety.

BACKGROUND OF THE INVENTION

This invention relates to a new type of high selectivity copolyimide membranes for gas, vapor, and liquid separations and more particularly for use in natural gas upgrading and hydrogen purification.

Membrane-based technologies have advantages of both low capital cost and high-energy efficiency compared to conventional separation methods. Polymeric membranes have proven to operate successfully in industrial gas separations such as in the separation of nitrogen from air and the separation of carbon dioxide from natural gas. Cellulose acetate (CA) is a polymer currently being used in commercial gas separation. For example, UOP LLC's Separex™ CA membrane is used extensively for carbon dioxide removal from natural gas. Nevertheless, while they have experienced commercial success, CA membranes still need improvement in a number of properties including selectivity, permeability, chemical and thermal stability.

Polymeric membrane materials have been found to be useful in gas separations. Numerous research articles and patents describe polymeric membrane materials (e.g., polyimides, polysulfones, polycarbonates, polyethers, polyamides, polyarylates, polypyrrolones, etc.) with desirable gas separation properties, particularly for use in oxygen/nitrogen separation (See, for example, U.S. Pat. No. 6,932,589). The polymeric membrane materials are typically used in processes in which a feed gas mixture contacts the upstream side of the membrane, resulting in a permeate mixture on the downstream side of the membrane with a greater mole fraction of one of the components than the composition of the original feed gas mixture. A pressure differential is maintained between the upstream and downstream sides, providing the driving force for permeation. The downstream side can be maintained as a vacuum, or at any pressure below the upstream pressure.

The membrane performance is characterized by the flux of a gas component across the membrane. This flux can be expressed as a quantity called the permeability (P), which is a pressure- and thickness-normalized flux of a given component. The separation of a gas mixture is achieved by a membrane material that permits a faster permeation rate for one component (i.e., higher permeability) over that of another component. The efficiency of the membrane in enriching a component over another component in the permeate stream can be expressed as a quantity called selectivity. Selectivity can be defined as the ratio of the permeabilities of the gas components across the membrane (i.e., PA/PB, where A and B are the two components). A membrane's permeability and selectivity are material properties of the membrane material itself, and thus these properties are ideally constant with feed pressure, flow rate and other process conditions. However, permeability and selectivity are both temperature-dependent. It is desired to develop membrane materials with a high selectivity (efficiency) for the desired component, while maintaining a high permeability (productivity) for the desired component.

US 2005/0268783 A1 disclosed chemically cross-linked polyimide hollow fiber membranes prepared from a monoesterified polymer followed by final cross-linking after hollow fiber formation.

U.S. Pat. No. 7,485,173 disclosed UV cross-linked mixed matrix membranes via UV radiation. The cross-linked mixed matrix membranes comprise microporous materials dispersed in the continuous UV cross-linked polymer matrix.

U.S. Pat. No. 8,337,598 disclosed a thin film composite hollow fiber membrane with a core layer and a UV-cross-linked polyimide polymer sheath layer.

The present invention provides a new type of high selectivity copolyimide membranes for gas, vapor, and liquid separations.

SUMMARY OF THE INVENTION

The present invention generally relates to gas separation membranes and, more particularly, to a new type of high selectivity copolyimide membranes for gas, vapor, and liquid separations.

The present invention provides new types of high selectivity copolyimide membranes for gas separations. One high selectivity copolyimide dense film membrane described in the present invention is fabricated from poly(3,3',4,4'-diphenylsulfone tetracarboxylic dianhydride-3,3',5,5'-tetramethyl-4,4'-methylene dianiline-3,3'-diaminodiphenyl sulfone) copolyimide (abbreviated as TD-PI-3-2), which is derived from the polycondensation reaction of 3,3',4,4'-diphenylsulfone tetracarboxylic dianhydride (DSDA) with a mixture of two different diamines including 3,3',5,5'-tetramethyl-4,4'-methylene dianiline (TMMDA) and 3,3'-diaminodiphenyl sulfone (3,3'-DDS) (TMMDA:3,3'-DDS=3:2 (molar ratio)). Gas permeation tests showed that this TD-PI-3-2 copolyimide dense film membrane has an intrinsic $CO_2$ permeability of 4.55 Barrers and high single-gas $CO_2/CH_4$ selectivity of 36.1 at 50° C. under 791 kPa for $CO_2/CH_4$ separation. This dense film membrane also has intrinsic $H_2$ permeability of 19.3 Barrers and high single-gas $H_2/CH_4$ selectivity of 153.0 at 50° C. under 791 kPa for $H_2/CH_4$ separation. The TD-PI-3-2 copolyimide dense film membrane also has intrinsic He permeability of 20.8 Barrers and high single-gas He/CH4 selectivity of 165.1 at 50° C. under 791 kPa for He/CH4 separation.

Another high selectivity copolyimide dense film membrane described in the present invention is fabricated from poly(3,3',4,4'-diphenylsulfone tetracarboxylic dianhydride-3,3',5,5'-tetramethyl-4,4'-methylene dianiline-3,3'-dihydroxy-4,4'-diamino-biphenyl-3,3'-diaminodiphenyl sulfone) copolyimide (abbreviated as THD-PI-2-1-1), which is derived from the polycondensation reaction of DSDA with a mixture of three different diamines including TMMDA, 3,3'-dihydroxy-4,4'-diamino-biphenyl (HAB), and 3,3'-DDS (TMMDA:HAB:3,3'-DDS=2:1:1 (molar ratio)). Gas permeation tests showed that this THD-PI-2-1-1 copolyimide dense film membrane has an intrinsic CO2 permeability of 3.3 Barrers and high single-gas CO2/CH4 selectivity of 37.8 at 50° C. under 791 kPa for CO2/CH4 separation. This dense film membrane also has intrinsic H2 permeability of 15.5 Barrers and high single-gas H2/CH4 selectivity of 178.0 at 50° C. under 791 kPa for H2/CH4 separation. The THD-PI-2-1-1 copolyimide dense film membrane also has intrinsic He permeability of 17.3 Barrers and high single-gas He/CH4 selectivity of 198.5 at 50° C. under 791 kPa for He/CH4 separation.

Yet another high selectivity copolyimide dense film membrane described in the present invention is fabricated from poly(3,3',4,4'-diphenylsulfone tetracarboxylic dianhydride-2,4,6-trimethyl-1,3-phenylenediamine-3,3'-dihydroxy-4,4'-diamino-biphenyl-3,3'-diaminodiphenyl sulfone) copolyimide (abbreviated as MHD-PI-2-1-1), which is derived from the polycondensation reaction of DSDA with a mixture of three different diamines including 2,4,6-trimethyl-1,3-phenylenediamine (TMPDA), 3,3'-dihydroxy-4,4'-diamino-biphenyl (HAB), and 3,3'-DDS (TMPDA:HAB:3,3'-DDS=2:1:1 (molar ratio)). Gas permeation tests showed that this MHD-PI-2-1-1 copolyimide dense film membrane has an intrinsic CO2 permeability of 4.20 Barrers and high single-gas CO2/CH4 selectivity of 43.3 at 50° C. under 791 kPa for CO2/CH4 separation. This dense film membrane also has intrinsic H2 permeability of 18.7 Barrers and high single-gas H2/CH4 selectivity of 192.3 at 50° C. under 791 kPa for H2/CH4 separation. The MHD-PI-2-1-1 copolyimide dense film membrane also has intrinsic He permeability of 21.1 Barrers and high single-gas He/CH4 selectivity of 217 at 50° C. under 791 kPa for He/CH4 separation.

The membrane dope formulation for the preparation of the high selectivity copolyimide membranes in the present invention comprises N-methylpyrrolidone (NMP) and 1,3-dioxolane which are good solvents for the high selectivity copolyimide polymer. In some cases, the membrane dope formulation for the preparation of the high selectivity copolyimide membranes in the present invention also comprises acetone and isopropanol (or methanol) which are poor solvents for the high selectivity copolyimide. The new high selectivity copolyimide membranes described in the current invention have either flat sheet (spiral wound) or hollow fiber geometry. In some cases, the selective skin layer surface of the high selectivity copolyimide membranes is coated with a thin layer of material such as a polysiloxane, a fluoropolymer, a thermally curable silicone rubber, or a UV radiation cured silicone rubber.

In another embodiment of the invention, this invention pertains to a new type of high selectivity copolyimide membranes that have undergone an additional UV cross-linking step. The UV cross-linked high selectivity copolyimide membrane described in the present invention is prepared by UV cross-linking of the high selectivity copolyimide membrane via exposure of the membrane to UV radiation. The high selectivity copolyimides used for the preparation of the UV cross-linked high selectivity copolyimide membranes described in the current invention have UV cross-linkable sulfonyl (—SO2-) functional groups. The UV cross-linked high selectivity copolyimide membranes comprise polymer chain segments where at least part of these polymer chain segments are cross-linked to each other through possible direct covalent bonds by exposure to UV radiation. UV cross-linking of the high selectivity copolyimide membranes provides the membranes with improved selectivities compared to the corresponding uncross-linked high selectivity copolyimide membranes.

The invention provides a process for separating at least one gas from a mixture of gases using the new high selectivity copolyimide membranes described herein, the process comprising: (a) providing a high selectivity copolyimide membrane described in the present invention which is permeable to said at least one gas; (b) contacting the mixture on one side of the high selectivity copolyimide membrane to cause said at least one gas to permeate the membrane; and (c) removing from the opposite side of the membrane a permeate gas composition comprising a portion of said at least one gas which permeated said membrane.

The new high selectivity copolyimide membranes are not only suitable for a variety of liquid, gas, and vapor separations such as desalination of water by reverse osmosis, non-aqueous liquid separation such as deep desulfurization of gasoline and diesel fuels, ethanol/water separations, pervaporation dehydration of aqueous/organic mixtures, CO2/CH4, CO2/N2, H2/CH4, O2/N2, H2S/CH4, olefin/paraffin, iso/normal paraffins separations, and other light gas mixture separations, but also can be used for other applications such as for catalysis and fuel cell applications.

DETAILED DESCRIPTION OF THE INVENTION

The use of membranes for separation of both gases and liquids is a growing technological area with potentially high economic reward due to the low energy requirements and the potential for scaling up of modular membrane designs. Advances in membrane technology, with the continuing development of new membrane materials and new methods for the production of high performance membranes will make this technology even more competitive with traditional, high-energy intensive and costly processes such as distillation. Among the applications for large scale gas separation membrane systems are nitrogen enrichment, oxygen enrichment, hydrogen recovery, removal of hydrogen sulfide and carbon dioxide from natural gas and dehydration of air and natural gas. Various hydrocarbon separations are potential applications for the appropriate membrane system. The membranes that are used in these applications must have high selectivity, durability, and productivity in processing large volumes of gas or liquid in order to be economically successful. Membranes for gas separations have evolved rapidly in the past 25 years due to their easy processability for scale-up and low energy requirements. More than 90% of the membrane gas separation applications involve the separation of noncondensable gases such as carbon dioxide from methane, nitrogen from air, and hydrogen from nitrogen, argon or methane. Membrane gas separation is of special interest to petroleum producers and refiners, chemical companies, and industrial gas suppliers. Several applications of membrane gas separation have achieved commercial success, including nitrogen enrichment from air, carbon dioxide removal from natural gas and biogas and in enhanced oil recovery.

The present invention provides a new type of high selectivity copolyimide membranes. This invention also pertains to the application of these high selectivity copolyimide membranes for a variety of gas, vapor, and liquid separations such as separations of CO2/CH4, He/CH4, H2S/CH4, CO2/N2, olefin/paraffin separations (e.g. propylene/propane separation), H2/CH4, O2/N2, iso/normal paraffins, polar molecules such as H2O, H2S, and NH3/mixtures with CH4, N2, H2, and other light gases separations, as well as for liquid separations such as desalination and pervaporation.

The new high selectivity copolyimide polymers used for making the high selectivity copolyimide membranes described in the current invention comprise a plurality of first repeating units of formula (I):

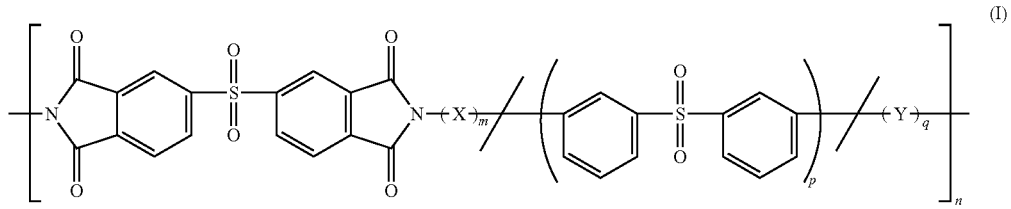

wherein X is selected from the group consisting of

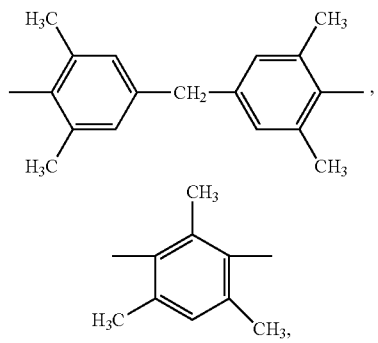

and mixtures thereof; wherein Y is

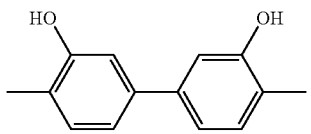

wherein p and m are independent integers from 2 to 500; wherein q is an integer from 2 to 500; wherein the molar ratio of m to p is in a range of 10:1 to 1:3 and the molar ratio of p to q is in a range of 10:1 to 1:3.

The high selectivity copolyimide polymers comprising a plurality of first repeating units of formula (I) described in the current invention have a weight average molecular weight in the range of 50,000 to 1,000,000 Daltons, and preferably between 70,000 to 500,000 Daltons.

Some examples of the high selectivity copolyimide polymers used for making the high selectivity copolyimide membranes described in the current invention may include, but are not limited to: poly(3,3',4,4'-diphenylsulfone tetracarboxylic dianhydride-3,3',5,5'-tetramethyl-4,4'-methylene dianiline-3,3'-diaminodiphenyl sulfone) copolyimide (abbreviated as TD-PI-3-2), which is derived from the polycondensation reaction of 3,3',4,4'-diphenylsulfone tetracarboxylic dianhydride (DSDA) with a mixture of two different diamines including 3,3',5,5'-tetramethyl-4,4'-methylene dianiline (TMMDA) and 3,3'-diaminodiphenyl sulfone (3,3'-DDS) (TMMDA:3,3'-DDS=3:2 (molar ratio)), poly(3, 3',4,4'-diphenylsulfone tetracarboxylic dianhydride-3,3',5, 5'-tetramethyl-4,4'-methylene dianiline-3,3'-dihydroxy-4,4'-diamino-biphenyl-3,3'-diaminodiphenyl sulfone) copolyimide (abbreviated as THD-PI-2-1-1) derived from the polycondensation reaction of DSDA with a mixture of three different diamines including TMMDA, 3,3'-dihydroxy-4,4'-diamino-biphenyl (HAB), and 3,3'-DDS (TMMDA:HAB:3,3'-DDS=2:1:1 (molar ratio)); poly(3,3',4,4'-diphenylsulfone tetracarboxylic dianhydride-2,4,6-trimethyl-m-phenylenediamine-3,3'-diaminodiphenyl sulfone) copolyimide (abbreviated as TPD-PI-3-2) derived from the polycondensation reaction of DSDA with a mixture of 2,4,6-trimethyl-m-phenylenediamine (TMPDA) and 3,3'-DDS (TMPDA:3,3'-DDS=3:2 (molar ratio)); poly(3,3',4,4'-diphenylsulfone tetracarboxylic dianhydride-2,4,6-trimethyl-1,3-phenylenediamine-3,3'-dihydroxy-4,4'-diamino-biphenyl-3,3'-diaminodiphenyl sulfone) copolyimide (abbreviated as MHD-PI-2-1-1), which is derived from the polycondensation reaction of DSDA with a mixture of three different diamines including TMPDA, HAB, and 3,3'-DDS (TMPDA:HAB:3,3'-DDS=2:1:1 (molar ratio)).

The copolyimide polymers comprising a plurality of first repeating units of formula (I) used for the preparation of the high selectivity copolyimide membranes described in the current invention are synthesized from DSDA dianhydride and at least two diamines selected from a group consisting of a mixture of TMMDA and 3,3'-DDS, a mixture of TMPDA and 3,3'-DDS, a mixture of TMMDA, 3,3'-DDS, and HAB, and a mixture of PMPDA, 3,3'-DDS, and HAB. To prepare high selectivity copolyimide membranes with intrinsic single-gas $CO_2/CH_4$ selectivity of at least 34 under the testing conditions of 50° C., 790 kPa (100 psig) single gas pressure as claimed in the current invention without using the expensive 2,2'-bis(3,4-dicarboxyphenyl) hexafluoropropane dianhydride (6FDA) monomer as disclosed in the literature, the copolyimide polymers comprising a plurality of first repeating units of formula (I) disclosed in the present invention must comprise repeating units synthesized from DSDA dianhydride and a mixture of TMMDA and 3,3'-DDS diamines or a mixture of TMPDA and 3,3'-DDS diamines. U.S. Pat. Nos. 8,710,173, 8,704,030, 8,366,804, and 8,614,288 disclosed high permeability polyimide membranes synthesized from TMMDA and other diamine monomers for gas separations. However, the polyimides disclosed in these patents did not incorporate 3,3'-DDS diamine monomer. The polyimides showed intrinsic single-gas $CO_2/CH_4$ selectivity of less than 30 under the testing conditions of 50° C., 790 kPa (100 psig) single gas pressure.

The copolyimides synthesized from TMMDA diamine and DSDA dianhydride, or from TMPDA diamine and DSDA dianhydride, or from a mixture of TMMDA and HAB diamines and DSDA dianhydride cannot provide the copolyimide membrane with selectivity as high as the high selectivity copolyimide membranes described in the current invention. The present invention discloses that it is critical to use a combination of TMMDA and 3,3'-DDS diamine monomers with DSDA dianhydride or use a combination of TMPDA and 3,3'-DDS diamine monomers with DSDA dianhydride for the synthesis of a high selectivity copolyimide polymer wherein said copolyimide polymer has CO2/CH4 selectivity of at least 34 under 50° C., 791 kPa (100 psig) single-gas testing conditions. In addition, the present invention discloses that copolyimides synthesized from a combination of TMMDA and 3,3'-DDS diamine monomers or a combination of TMPDA and 3,3'-DDS diamine monomers with other dianhydride monomers such as pyromellitic dianhydride (PMDA) and 3,3',4,4'-benzophenonetetracarboxylic dianhydride (BTDA) also fail to provide selectivities for CO2/CH4 separation as high as the high selectivity copolyimides disclosed in the current invention.

The membrane dope formulation for the preparation of high selectivity copolyimide membranes in the present invention comprises good solvents for the polyimide polymer that can completely dissolve the high selectivity copolyimide. Representative good solvents for use in this invention include N-methylpyrrolidone (NMP), N,N-dimethyl acetamide (DMAC), methylene chloride, N,N-dimethylformamide (DMF), dimethyl sulfoxide (DMSO), dioxanes, 1,3-dioxolane, mixtures thereof, others known to those skilled in the art and mixtures thereof. In some cases, the membrane dope formulation for the preparation of the high selectivity copolyimide membranes in the present invention also comprises poor solvents for the high selectivity copolyimide polymer that cannot dissolve the polymer such as acetone, methanol, ethanol, tetrahydrofuran (THF), toluene, n-octane, n-decane, lactic acid, citric acid, isopropanol, and mixtures thereof. It is believed that the proper weight ratio of the solvents used in the present invention provides asymmetric high selectivity copolyimide membranes with <100 nm super thin nonporous selective skin layer which results in high permeances.

The high selectivity copolyimide membranes described in the present invention can be fabricated into any convenient geometry such as flat sheet (or spiral wound), tube, or hollow fiber.

In another embodiment of the invention, this invention pertains to a new type of high selectivity copolyimide membranes that have undergone an additional UV cross-linking step. The UV cross-linked high selectivity copolyimide membrane described in the present invention is prepared by UV cross-linking of the high selectivity copolyimide membrane via exposure of the membrane to UV radiation. The high selectivity copolyimides used for the preparation of the UV cross-linked high selectivity copolyimide membranes described in the current invention have UV cross-linkable sulfonyl (—SO2-) functional groups. The UV cross-linked high selectivity copolyimide membranes comprise polymer chain segments where at least part of these polymer chain segments are cross-linked to each other through possible direct covalent bonds by exposure to UV radiation. UV cross-linking of the high selectivity copolyimide membranes provides the membranes with further improved selectivities compared to the corresponding uncross-linked high selectivity copolyimide membranes.

Optimization of the cross-linking degree in the UV cross-linked high selectivity copolyimide membranes described in the present invention should promote the tailoring of membranes for a wide range of gas and liquid separations with improved permeation properties and environmental stability. The cross-linking degree of the UV-cross-linked high selectivity copolyimide membranes of the present invention can be controlled by adjusting the distance between the UV lamp and the membrane surface, UV radiation time, wavelength and strength of UV light, etc. Preferably, the distance from the UV lamp to the membrane surface is in the range of 0.8 to 25.4 cm (0.3 to 10 inches) with a UV light provided from 12 watt to 450 watt low pressure or medium pressure mercury arc lamp, and the UV radiation time is in the range of 0.5 min to 1 h. More preferably, the distance from the UV lamp to the membrane surface is in the range of 0.8 to 5.1 cm (0.3 to 2 inches) with a UV light provided from 12 watt to 450 watt low pressure or medium pressure mercury arc lamp, and the UV radiation time is in the range of 1 to 40 minutes.

The present invention also involves blend polymer membranes comprising the high selectivity copolyimides described in the current invention. In some embodiments of the invention, the blend polymer membranes comprising the high selectivity copolyimides described in the current invention may be subjected to an additional UV cross-linking step to further increase the selectivity of the membrane.

The term "blend polymer membrane" in the present invention refers to a membrane prepared from a blend of two or more polymers. The blend polymer membrane described in the current invention comprises a high selectivity copolyimide described in the present invention and polyethersulfone (PES).

In some cases, it is desirable to cross-link the blend polymer membrane comprising high selectivity copolyimide and PES to improve the membrane selectivity. The cross-linked blend polymer membrane described in the current invention is prepared by UV cross-linking of the blend polymer membrane comprising high selectivity copolyimide and PES. After UV cross-linking, the cross-linked blend polymer membrane comprises high selectivity copolyimide and PES polymer chain segments wherein at least part of these polymer chain segments are cross-linked to each other through possible direct covalent bonds by exposure to UV radiation. The UV cross-linking of the blend polymer membranes offers the membranes superior selectivity and improved chemical and thermal stabilities than the corresponding un-cross-linked blend polymer membranes comprising high selectivity copolyimide and PES.

The invention provides a process for separating at least one gas from a mixture of gases using the new high selectivity copolyimide membranes described herein, the process comprising: (a) providing a high selectivity copolyimide membranes described in the present invention which is permeable to said at least one gas; (b) contacting the mixture on one side of said membrane to cause said at least one gas to permeate said membrane; and (c) removing from the opposite side of said membrane a permeate gas composition comprising a portion of said at least one gas which permeated said membrane.

The new high selectivity copolyimide membranes described in the present invention are especially useful in the purification, separation or adsorption of a particular species in the liquid or gas phase. In addition to separation of pairs of gases, these said membranes described in the present invention may, for example, be used for the desalination of water by reverse osmosis or for the separation of proteins or other thermally unstable compounds, e.g. in the pharmaceutical and biotechnology industries. These said membranes described in the present invention may also be used in fermenters and bioreactors to transport gases into the reaction vessel and transfer cell culture medium out of the vessel. Additionally, these said membranes described in the present invention may be used for the removal of microorganisms from air or water streams, water purification, and ethanol production in a continuous fermentation/membrane pervaporation system, and in detection or removal of trace compounds or metal salts in air or water streams.

The new high selectivity copolyimide membranes described in the present invention are especially useful in gas separation processes in air purification, petrochemical, refinery, and natural gas industries. Examples of such separations include separation of volatile organic compounds (such as toluene, xylene, and acetone) from an atmospheric gas, such as nitrogen or oxygen and nitrogen recovery from air. Further examples of such separations are for the separation of $CO_2$ or $H_2S$ from natural gas, H2 from N2, CH4, and Ar in ammonia purge gas streams, H2 recovery in refineries, olefin/paraffin separations such as propylene/propane separation, and iso/normal paraffin separations. Any given pair or group of gases that differ in molecular size, for example nitrogen and oxygen, carbon dioxide and methane, hydrogen and methane or carbon monoxide, helium and methane, can be separated using these said membranes described in the present invention. More than two gases can be removed from a third gas. For example, some of the gas components which can be selectively removed from a raw natural gas using the membrane described herein include carbon dioxide, oxygen, nitrogen, water vapor, hydrogen sulfide, helium, and other trace gases. Some of the gas components that can be selectively retained include hydrocarbon gases. When permeable components are acid components selected from the group consisting of carbon dioxide, hydrogen sulfide, and mixtures thereof and are removed from a hydrocarbon mixture such as natural gas, one module, or at least two in parallel service, or a series of modules may be utilized to remove the acid components. For example, when one module is utilized, the pressure of the feed gas may vary from 275 kPa to about 7.5 MPa (25 to 4000 psig). The differential pressure across the membrane can be as low as about 70 kPa or as high as 14.5 MPa (about 10 psi or as high as about 2100 psi) depending on many factors such as the particular membrane used, the flow rate of the inlet stream and the availability of a compressor to compress the permeate stream if such compression is desired. Differential pressure greater than about 14.5 MPa (2100 psi) may rupture the membrane. A differential pressure of at least 0.7 MPa (100 psi) is preferred since lower differential pressures may require more modules, more time and compression of intermediate product streams. The operating temperature of the process may vary depending upon the temperature of the feed stream and upon ambient temperature conditions. Preferably, the effective operating temperature of the membranes of the present invention will range from about −50° to about 150° C. More preferably, the effective operating temperature of the high selectivity copolyimide membranes of the present invention will range from about −20° to about 100° C., and most preferably, the effective operating temperature of the membranes of the present invention will range from about 25° to about 100° C.

The new high selectivity copolyimide membranes described in the present invention are also especially useful in gas/vapor separation processes in chemical, petrochemical, pharmaceutical and allied industries for removing organic vapors from gas streams, e.g. in off-gas treatment for recovery of volatile organic compounds to meet clean air regulations, or within process streams in production plants so that valuable compounds (e.g., vinylchloride monomer, propylene) may be recovered. Further examples of gas/vapor separation processes in which these said membranes described in the present invention may be used are hydrocarbon vapor separation from hydrogen in oil and gas refineries, for hydrocarbon dew pointing of natural gas (i.e. to decrease the hydrocarbon dew point to below the lowest possible export pipeline temperature so that liquid hydrocarbons do not separate in the pipeline), for control of methane number in fuel gas for gas engines and gas turbines, and for gasoline recovery.

The new high selectivity copolyimide membranes described in the present invention also have immediate application to concentration of olefins in a paraffin/olefin stream for an olefin cracking application. For example, these said membranes described in the present invention can be used for propylene/propane separation to increase the concentration of the effluent in a catalytic dehydrogenation reaction for the production of propylene from propane and isobutylene from isobutane. Therefore, the number of stages of a propylene/propane splitter that is required to get polymer grade propylene can be reduced. Another application for these said membranes described in the present invention is for separating isoparaffin and normal paraffin in light paraffin isomerization and MaxEne™, a process for enhancing the concentration of normal paraffin (n-paraffin) in the naphtha cracker feedstock, which can be then converted to ethylene.

The new high selectivity copolyimide membranes described in the present invention can also be operated at high temperature to provide the sufficient dew point margin for natural gas upgrading (e.g, $CO_2$ removal from natural gas). These said membranes described in the present invention can be used in either a single stage membrane or as the first or/and second stage membrane in a two stage membrane system for natural gas upgrading.

These new high selectivity copolyimide membranes described in the present invention may also be used in the separation of liquid mixtures by pervaporation, such as in the removal of organic compounds (e. g., alcohols, phenols, chlorinated hydrocarbons, pyridines, ketones) from water such as aqueous effluents or process fluids. A membrane which is ethanol-selective would be used to increase the ethanol concentration in relatively dilute ethanol solutions (5-10% ethanol) obtained by fermentation processes. Another liquid phase separation example using these said membranes described in the present invention is the deep desulfurization of gasoline and diesel fuels by a pervaporation membrane process similar to the process described in U.S. Pat. No. 7,048,846, incorporated by reference herein in its entirety. These said membranes described in the present invention that are selective to sulfur-containing molecules would be used to selectively remove sulfur-containing molecules from fluid catalytic cracking (FCC) and other naphtha hydrocarbon streams. Further liquid phase examples include the separation of one organic component from another organic component, e.g. to separate isomers of organic compounds. Mixtures of organic compounds which may be separated using these said membranes in the present invention include: ethylacetate-ethanol, diethylether-ethanol, acetic acid-ethanol, benzene-ethanol, chloroform-ethanol, chloroform-methanol, acetone-isopropylether, allylalcohol-allylether, allylalcohol-cyclohexane, butanol-butylacetate, butanol-1-butylether, ethanol-ethylbutylether, propylacetate-propanol, isopropylether-isopropanol, methanol-ethanol-isopropanol, and ethylacetate-ethanol-acetic acid.

EXAMPLES

The following examples are provided to illustrate one or more preferred embodiments of the invention, but are not limited embodiments thereof. Numerous variations can be made to the following examples that lie within the scope of the invention.

Example 1

Synthesis of TD-PI-3-2 Copolyimide

An aromatic poly(3,3',4,4'-diphenylsulfone tetracarboxylic dianhydride-3,3',5,5'-tetramethyl-4,4'-methylene dianiline-3,3'-diaminodiphenyl sulfone) copolyimide (abbreviated TD-PI-3-2) containing UV cross linkable sulfonic group was synthesized from the polycondensation reaction of 3,3',4,4'-diphenylsulfone tetracarboxylic dianhydride (DSDA) with a mixture of 3,3',5,5'-tetramethyl-4,4'-methylene dianiline (TMMDA) and 3,3'-diaminodiphenyl sulfone (3,3'-DDS). The molar ratio of TMMDA to 3,3'-DDS was 3:2 and this specific copolyimide polymer described here was abbreviated as TD-PI-3-2. The polymerization reaction was carried out in anhydrous dimethyl acetamide (DMAc) polar solvent by a two-step chemical imidization process involving the formation of the poly (amic acid) in the first step followed by a solution imidization process. For example, a 500 mL three neck round bottomed flask equipped with a nitrogen inlet and a mechanical stirrer was charged with 15.3 g of TMMDA and 9.9 g of 3,3'-DDS along with 60 g of DMAc solvent. Once the TMMDA and 3,3'-DDS were fully dissolved in DMAc, 36.9 g of DSDA solid powder was added to the round bottom flask under constant stirring. 188 g of DMAc was then added to the solution within 5 h after the addition of DSDA. The reaction mixture was stirred for 24 hours under inert condition and ambient temperature to give a viscous poly (amic acid) solution. In the second step of the reaction 25.5 g of acetic anhydride was added to the reaction mixture under constant stirring followed by 33.2 g of anhydrous pyridine. The solution mixture was mechanically stirred for an additional 2.5 hours at 95° C. to yield TD-PI-3-2. The final polymer product in a fine fiber form was recovered by slowly precipitating the reaction mixture into large amount of isopropanol and acetone mixture with 1:1 volume ratio. The final TD-PI-3-2 copolyimide was then thoroughly rinsed with isopropanol and dried at 200° C. in vacuum for 48 hours.

Example 2

Preparation of TD-PI-3-2 Dense Film Membrane

The TD-PI-3-2 dense film membrane was prepared as follows: 5.0 g of TD-PI-3-2 copolyimide was added to 20.0 g of NMP. The mixture was mechanically stirred for 2 hours to form a homogeneous casting dope. The resulting homogeneous casting dope was filtered and allowed to degas overnight. The TD-PI-3-2 copolyimide polymer dense film membrane was prepared from the bubble free casting dope on a clean glass plate using a doctor knife with 20 mil gap. The membrane was dried at 62° C. for 12 h on a hot plate to remove the solvent. Finally, the membrane was removed from the glass plate and further dried at 200° C. under vacuum for at least 48 h to completely remove the residual solvent to form TD-PI-3-2 dense film membrane.

Example 3

Preparation of UV Cross-Linked TD-PI-3-2 Dense Film Membrane

The TD-PI-3-2 dense film membrane prepared in Example 2 was further UV cross-linked by exposure to UV radiation using 254 nm wavelength UV light generated from a UV lamp with 1.9 cm (0.75 inch) distance from TD-PI-3-2 dense film membrane surface to the UV lamp and a radiation time of 10 min at 50° C.

Example 4

Synthesis of THD-PI-2-1-1 Copolyimide

An aromatic poly(3,3',4,4'-diphenylsulfone tetracarboxylic dianhydride-3,3',5,5'-tetramethyl-4,4'-methylene dianiline-3,3'-dihydroxy-4,4'-diamino-biphenyl-3,3'-diaminodiphenyl sulfone) copolyimide (abbreviated as THD-PI-2-1-1) containing UV cross linkable sulfonic group was synthesized from the polycondensation reaction of DSDA with a mixture of TMMDA, 3,3'-dihydroxy-4,4'-diamino-biphenyl (HAB), and 3,3'-DDS. The molar ratio of TMMDA to HAB to 3,3'-DDS was 2:1:1 and this specific copolyimide polymer described here was abbreviated as THD-PI-2-1-1. THD-PI-2-1-1 was synthesized using the procedure similar to that used for TD-PI-3-2 copolyimide synthesis as disclosed in Example 1.

Example 5

Preparation of THD-PI-2-1-1 Dense Film Membrane

The THD-PI-2-1-1 dense film membrane was prepared using the procedure similar to that used for TD-PI-3-2 copolyimide dense film membrane preparation as disclosed in Example 2.

Example 6

Synthesis of TPD-PI-3-2 Copolyimide

An aromatic poly(3,3',4,4'-diphenylsulfone tetracarboxylic dianhydride-2,4,6-trimethyl-m-phenylenediamine-3,3'-diaminodiphenyl sulfone) copolyimide (abbreviated as TPD-PI-3-2) containing UV cross linkable sulfonic group was synthesized from the polycondensation reaction of DSDA with a mixture of 2,4,6-trimethyl-m-phenylenediamine (TMPDA) and 3,3'-DDS. The molar ratio of TMPDA to 3,3'-DDS was 3:2 and this specific copolyimide polymer described here was abbreviated as TPD-PI-3-2. TPD-PI-3-2 was synthesized using the procedure similar to that used for TD-PI-3-2 copolyimide synthesis as disclosed in Example 1.

Example 7

Preparation of TPD-PI-3-2 Dense Film Membrane

The TPD-PI-3-2 dense film membrane was prepared using the procedure similar to that used for TD-PI-3-2 copolyimide dense film membrane preparation as disclosed in Example 2.

Example 8

Synthesis of MHD-PI-2-1-1 Copolyimide

An aromatic poly(3,3',4,4'-diphenylsulfone tetracarboxylic dianhydride-2,4,6-trimethyl-1,3-phenylenediamine-3,3'-dihydroxy-4,4'-diamino-biphenyl-3,3'-diaminodiphenyl sulfone) copolyimide (abbreviated as MHD-PI-2-1-1) containing UV cross linkable sulfonic group was synthesized from the polycondensation reaction of DSDA with a mixture of three different diamines including TMPDA, HAB, and 3,3'-DDS. The molar ratio of TMPDA to HAB to 3,3'-DDS was 2:1:1 and this specific copolyimide polymer described here was abbreviated as MHD-PI-2-1-1. MHD-PI-2-1-1 was synthesized using the procedure similar to that used for TD-PI-3-2 copolyimide synthesis as disclosed in Example 1.

Example 9

Preparation of MHD-PI-2-1-1 Dense Film Membrane

The MHD-PI-2-1-1 dense film membrane was prepared using the procedure similar to that used for MHD-PI-2-1-1 copolyimide dense film membrane preparation as disclosed in Example 2.

Example 10

$CO_2/CH_4$, $H_2/CH_4$, and $He/CH_4$ Separation Properties of TD-PI-3-2, THD-PI-2-1-1, TPD-PI-3-2, MHD-PI-2-1-1, and UV Cross-Linked TD-PI-3-2 Dense Film Membranes The permeabilities of $CO_2$, $H_2$, He, and $CH_4$ ($P_{CO2}$, $P_{H2}$, $P_{He}$, and $P_{CH4}$) and selectivities of $CO_2/CH_4$ ($\alpha_{CO2/CH4}$), $H_2/CH_4$ ($\alpha_{H2/CH4}$), and $He/CH_4$ ($\alpha_{He/CH4}$) of the TD-PI-3-2, THD-PI-2-1-1, TPD-PI-3-2, MHD-PI-2-1-1, and UV cross-linked TD-PI-3-2 dense film membranes were measured by pure gas measurements at 50° C. under about 790 kPa (100 psig) pressure. The results are shown in Table 1. It can be seen from Table 1 that TD-PI-3-2, THD-PI-2-1-1, TPD-PI-3-2, and MHD-PI-2-1-1 dense film membranes showed high selectivities for $CO_2/CH_4$, $H_2/CH_4$, and $He/CH_4$ separations. For example, TD-PI-3-2 dense film membrane showed $CO_2/CH_4$ selectivity higher than 35 and good $CO_2$ permeability of 4.55 Barrers under the testing conditions of 50° C., 790 kPa (100 psig) feed gas pressure. MHD-PI-2-1-1 dense film membrane showed high $CO_2/CH_4$ selectivity of 43.3 and good $CO_2$ permeability of 4.2 Barrers under the testing conditions of 50° C., 790 kPa (100 psig) feed gas pressure. TPD-PI-3-2 dense film membrane showed high $CO_2/CH_4$ selectivity of 40.4 and good $CO_2$ permeability of 5.53 Barrers under the testing conditions of 50° C., 790 kPa (100 psig) feed gas pressure. In addition, all the TD-PI-3-2, THD-PI-2-1-1, TPD-PI-3-2, and MHD-PI-2-1-1 dense film membranes can be UV cross-linked to achieve further enhanced selectivity. As an example, the UV cross-linked TD-PI-3-2 dense film membrane showed further improved selectivities for $CO_2/CH_4$, $H_2/CH_4$, and $He/CH_4$ separations.

TABLE 1

Pure gas permeation test results of dense film membranes for $CO_2/CH_4$, $H_2/CH_4$, and $He/CH_4$ separations [a]

| Dense film membrane | $P_{CO2}$ (Barrer) | $\alpha_{CO2/CH4}$ | $P_{H2}$ (Barrer) | $\alpha_{H2/CH4}$ | $P_{He}$ (Barrer) | $\alpha_{He/CH4}$ |
|---|---|---|---|---|---|---|
| TD-PI-3-2 | 4.55 | 36.1 | 19.3 | 153.0 | 20.8 | 165.1 |
| UV cross-linked TD-PI-3-2 | 3.54 | 43.5 | 19.2 | 237.0 | 20.5 | 252.7 |
| THD-PI-2-1-1 | 3.30 | 37.8 | 15.5 | 178.0 | 17.3 | 198.5 |
| TPD-PI-3-2 | 5.53 | 40.4 | 20.9 | 152.3 | 22.4 | 163.5 |
| MHD-PI-2-1-1 | 4.20 | 43.3 | 18.7 | 192.3 | 21.1 | 217 |

[a] Tested at 50° C. under 790 kPa (100 psig) pure gas pressure;
1 Barrer = $10^{-10}$ $(cm^3(STP) \cdot cm)/(cm^2 \cdot sec \cdot cmHg)$

Example 11

Preparation of THD-PI-2-1-1 Asymmetric Integrally-Skinned Flat Sheet Membrane

A membrane casting dope containing THD-PI-2-1-1, NMP, 1,3-dioxolane, and non-solvents was cast on a highly porous non-selective symmetric woven Nylon 6,6 fabric backing at a casting speed of 6 fpm at room temperature. The cast membrane was evaporated for 13 seconds to form the nascent asymmetric integrally-skinned flat sheet THD-PI-2-1-1 membrane with a thin dense selective skin layer of a THD-PI-2-1-1 polymer on the surface. The membrane was immersed into a cold water coagulation tank to generate the porous THD-PI-2-1-1 polymer non-selective asymmetric layer below the thin dense selective skin layer by phase inversion. The wet membrane was then immersed into a hot water tank to remove the trace amount of organic solvents in the membrane. Finally the wet membrane was wound up on a core roll for further drying. The wet polyimide membrane was dried at 70-95° C. The thin dense selective skin layer surface of the THD-PI-2-1-1 polymer for the dried membrane was then coated with a thin nonporous layer of epoxysilicone rubber. The epoxysilicone rubber coating layer and the thin dense selective skin layer surface of the coated asymmetric integrally-skinned THD-PI-2-1-1 flat sheet membrane was cross-linked via UV radiation for 4 min and 5 min, respectively, using a UV lamp with intensity of 1.45 mW/cm² to produce UV cross-linked THD-PI-2-1-1-4UV8 and THD-PI-2-1-1-5UV8 asymmetric integrally-skinned flat sheet membranes, respectively.

Example 12

Evaluation of $CO_2/CH_4$ Separation Performance of UV Cross-Linked THD-PI-2-1-1-4UV8 and THD-PI-2-1-1-5UV8 Asymmetric Integrally-Skinned Flat Sheet Membranes The UV cross-linked THD-PI-2-1-1-4UV8 and THD-PI-2-1-1-5UV8 asymmetric integrally-skinned flat sheet membranes were tested for $CO_2/CH_4$ separation at 50° C. under 6996 kPa (1000 psig) feed gas pressure with 10% of $CO_2$ and 90% of $CH_4$ in the feed. The results are shown in Table 2. It can be seen from Table 2 that both membranes showed and high $CO_2/CH_4$ selectivities of over 26 and good $CO_2$ permeances of over 35 GPU under testing conditions of 50° C., 6996 kPa (1000 psig) 10% $CO_2$ and 90% of $CH_4$ mixed feed gas pressure.

TABLE 2

$CO_2/CH_4$ separation performance of UV cross-linked THD-PI-2-1-1-4UV8 and THD-PI-2-1-1-5UV8 asymmetric integrally-skinned flat sheet membranes

| Membrane | $CO_2$ permeance (GPU) | $CO_2/CH_4$ selectivity |
|---|---|---|
| THD-PI-2-1-1-4UV8 | 36 | 26.6 |
| THD-PI-2-1-1-5UV8 | 48 | 28.3 |

1 GPU = $10^{-6}$ $cm^3$ (STP)/$cm^2$ s (cm Hg)
Testing conditions: 50° C., 6996 kPa (1000 psig) feed gas pressure, 10% $CO_2$ and 90% of $CH_4$ in the feed.

Comparative Example 1

Synthesis of DST-PI Polyimide

An aromatic poly(3,3',4,4'-diphenylsulfone tetracarboxylic dianhydride-3,3',5,5'-tetramethyl-4,4'-methylene dianiline) polyimide (abbreviated as DST-PI) containing UV cross linkable sulfonic group was synthesized from the polycondensation reaction of DSDA with TMMDA. This specific polyimide polymer described here was abbreviated as DST-PI. DST-PI was synthesized using the procedure similar to that used for TD-PI-3-2 copolyimide synthesis as disclosed in Example 1.

Comparative Example 2

Synthesis of PTD-PI-3-1 Copolyimide

An aromatic poly(3,3',4,4'-diphenylsulfone tetracarboxylic dianhydride-3,3',5,5'-tetramethyl-4,4'-methylene dianiline-) copolyimide (abbreviated as PTD-PI-3-1) containing UV cross linkable sulfonic group was synthesized from the polycondensation reaction of pyromellitic dianhydride (PMDA) with a mixture of two diamines including TMMDA and 3,3'-DDS. The molar ratio of TMMDA to 3,3'-DDS was 3:1 and this specific copolyimide polymer described here was abbreviated as PTD-PI-3-1. PTD-PI-3-1 was synthesized using the procedure similar to that used for TD-PI-3-2 copolyimide synthesis as disclosed in Example 1.

Comparative Example 3

Synthesis of DTH-PI-3-2 Copolyimide

An aromatic poly(pyromelitic dianhydride-3,3',5,5'-tetramethyl-4,4'-methylene dianiline-3,3'-diaminodiphenyl sulfone-3,3'-dihydroxy-4,4'-diamino-biphenyl) copolyimide (abbreviated as DTH-PI-3-2) containing UV cross linkable sulfonic group was synthesized from the polycondensation reaction of DSDA with a mixture of two diamines including TMMDA and HAB. The molar ratio of TMMDA to HAB was 3:2 and this specific copolyimide polymer described here was abbreviated as DTH-PI-3-2. DTH-PI-3-2 was synthesized using the procedure similar to that used for TD-PI-3-2 copolyimide synthesis as disclosed in Example 1.

Example 13

Several different copolyimide membranes made in accordance with the present invention were tested for their ability to separate carbon dioxide from methane, hydrogen from methane and helium from methane and compared to several membranes prepared using prior art polyimide or copolyimide polymers including commercially available P84 polyimide, TD-PI-3-2 copolyimide as described in Comparative Example 1, and PTD-PI-3-1 copolyimide as described in Comparative Example 2. These results are shown in Table 3. The last four rows show the results with the membranes of the present invention which have much better intrinsic properties than commercially available polymer membranes.

TABLE 3

Pure gas permeation test results of dense film membranes for $CO_2/CH_4$, $H_2/CH_4$, and $He/CH_4$ separations [a]

| Dense film membrane | $P_{CO2}$ (Barrer) | $\alpha_{CO2/CH4}$ | $P_{H2}$ (Barrer) | $\alpha_{H2/CH4}$ | $P_{He}$ (Barrer) | $\alpha_{He/CH4}$ |
|---|---|---|---|---|---|---|
| P84 | 2.10 | 27.2 | 8.56 | 110.8 | — | — |
| DST-PI | 20.3 | 28.8 | 54.8 | 77.9 | — | — |
| PTD-PI-3-1 | 92.2 | 17.2 | 139.9 | 26.2 | 97.6 | 18.2 |
| DTH-PI-3-2 | 5.16 | 28.5 | 18.9 | 104.4 | 20.0 | 110.3 |
| THD-PI-2-1-1 | 3.30 | 37.8 | 15.5 | 178.0 | 17.3 | 198.5 |
| MHD-PI-2-1-1 | 4.20 | 43.3 | 18.7 | 192.3 | 21.1 | 217 |
| TD-PI-3-2 | 4.55 | 36.1 | 19.3 | 153 | 20.8 | 165.1 |
| TPD-PI-3-2 | 5.53 | 40.4 | 20.9 | 152.3 | 22.4 | 163.5 |

[a] Tested at 50° C. under 790 kPa (100 psig) pure gas pressure;
1 Barrer = $10^{-10}$ $(cm^3(STP) \cdot cm)/(cm^2 \cdot sec \cdot cmHg)$

The invention claimed is:

1. A copolyimide membrane made from a copolyimide polymer comprising a plurality of first repeating units of formula (I):

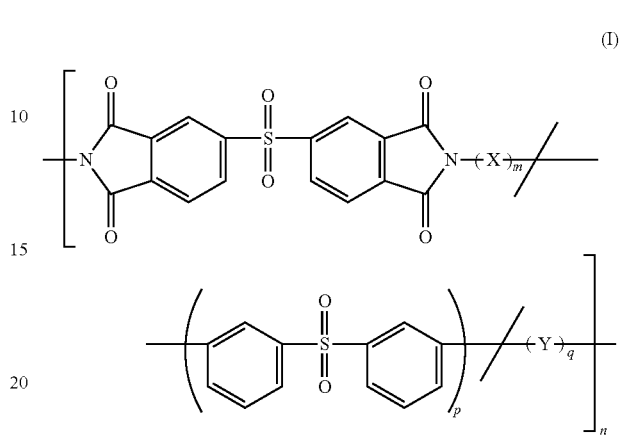

wherein X is selected from the group consisting of

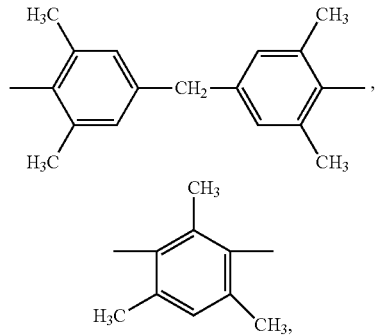

and mixtures thereof; wherein Y is

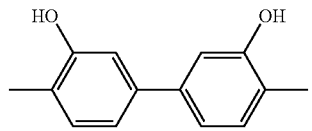

wherein p and m are independent integers from 2 to 500; q is an integer from 2 to 500; the molar ratio of m top is in a range of 10:1 to 1:3 and the molar ratio of p to q is in a range of 10:1 to 1:3.

2. The copolyimide membrane of claim 1 wherein said copolyimide polymer has a weight average molecular weight in a range of 50,000 to 1,000,000 Daltons.

3. The copolyimide membrane of claim 1 wherein said copolyimide polymer is selected from the group consisting of poly(3,3',4,4'-diphenylsulfone tetracarboxylic dianhydride-2,4,6-trimethyl-1,3-phenylenediamine-3,3'-dihydroxy-4,4'-diamino-biphenyl-3,3'-diaminodiphenyl sulfone) copolyimide (MHD-PI-2-1-1), and poly(3,3',4,4'-diphenylsulfone tetracarboxylic dianhydride-3,3',5,5'-tetramethyl-4, 4'-methylene dianiline-3,3'-dihydroxy-4,4'-diamino-biphenyl-3,3'-diaminodiphenyl sulfone) copolyimide (THD-PI-2-1-1).

4. The copolyimide membrane of claim 1 having a CO2/CH4 selectivity of 34 or higher under 50° C., 791 kPa (100 psig) single-gas testing conditions.

5. The copolyimide membrane of claim 1 further comprising an additional polyethersulfone polymer.

6. A process of making a copolyimide membrane comprising synthesis of a copolyimide polymer from 3,3',4,4'-diphenylsulfone tetracarboxylic dianhydride (DSDA) with a mixture of two or three different diamines, wherein said mixture of two or three different diamines are selected from the group consisting of a mixture of TMMDA, 3,3'-DDS and 3,3'-dihydroxy-4,4'-diamino-biphenyl (HAB); a mixture of 2,4,6-trimethyl-m-phenylenediamine (TMPDA), 3,3'-DDS and HAB.

7. The process of claim 6 wherein said copolyimide polymer comprises poly(3,3',4,4'-diphenylsulfone tetracarboxylic dianhydride-3,3',5,5'-tetramethyl-4,4'-methylene dianiline-3,3'-dihydroxy-4,4'-diamino-biphenyl-3,3'-diaminodiphenyl sulfone) copolyimide (THD-PI-2-1-1) derived from a polycondensation reaction of DSDA with a mixture of three different diamines comprising TMMDA, 3,3'-dihydroxy-4,4'-diamino-biphenyl (HAB), and 3,3'-DDS (TMMDA:HAB:3,3'-DDS=2:1:1 (molar ratio)); poly(3,3',4,4'-diphenylsulfone tetracarboxylic dianhydride-2,4,6-trimethyl-1,3-phenylenediamine-3,3'-dihydroxy-4,4'-diamino-biphenyl-3,3'-diaminodiphenyl sulfone) copolyimide (MHD-PI-2-1-1) derived from a polycondensation reaction of DSDA with a mixture of TMPDA, HAB, and 3,3'-DDS (TMPDA:HAB:3,3'-DDS=2:1:1 molar ratio).

8. The process of claim 6 further comprising crosslinking said copolyimide membrane by exposing said copolyimide membrane to UV light at a sufficient distance, UV wattage and UV radiation time to obtain a desired level of crosslinking.

9. A process for separating at least one gas from a mixture of gases, the process comprising:
(a) providing a copolyimide membrane made from a copolyimide polymer comprising a plurality of first repeating units of formula (I):

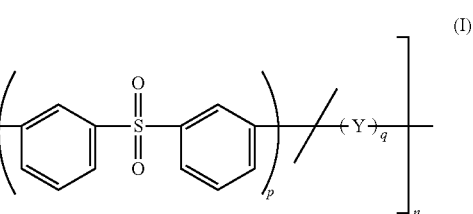

wherein X is selected from the group consisting of

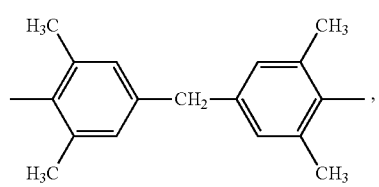

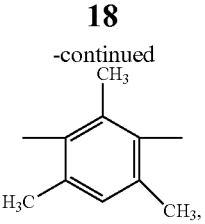

and mixtures thereof; wherein Y is

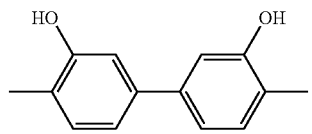

wherein p and m are independent integers from 2 to 500; q is an integer from 2 to 500; the molar ratio of m to p is in a range of 10:1 to 1:3 and the molar ratio of p to q is in a range of 10:1 to 1:3 wherein said copolyimide membrane is permeable to at least one gas from said mixture of gases;

(b) contacting the mixture of gases to one side of said copolyimide membrane to cause said at least one gas to permeate said copolyimide membrane; and (c) removing from the opposite side of said copolyimide membrane a permeate gas composition comprising a portion of said at least one gas which permeated said copolyimide membrane.

10. The process of claim 9 wherein said copolyimide membrane further comprises a polyethersulfone polymer.

11. The process of claim 9 wherein said mixture of gases comprises a mixture of volatile organic compounds in at least one atmospheric gas.

12. The process of claim 9 wherein the mixture of gases comprises hydrogen sulfide or carbon dioxide in natural gas.

13. The process of claim 9 wherein the mixture of gases comprises hydrogen in a mixture of nitrogen, methane and argon.

14. The process of claim 9 wherein the mixture of gases comprises olefins and paraffins.

15. The process of claim 9 wherein the mixture of gases comprises isoparaffins and normal paraffins.

16. The process of claim 9 wherein the mixture of gases comprises hydrogen in a refinery streams.

17. The process of claim 9 wherein the mixture of gases comprises a pair of gases selected from the group consisting of nitrogen and oxygen, carbon dioxide and methane, hydrogen and methane or carbon monoxide, and helium and methane.

18. A process of separating one or more liquids in a liquid mixture comprising contacting said one or more liquids in a pervaporation process to a membrane to separate one or more organic compounds from a liquid mixture wherein the membrane comprises a copolyimide membrane made from a copolyimide polymer comprising a plurality of first repeating units of formula (I):

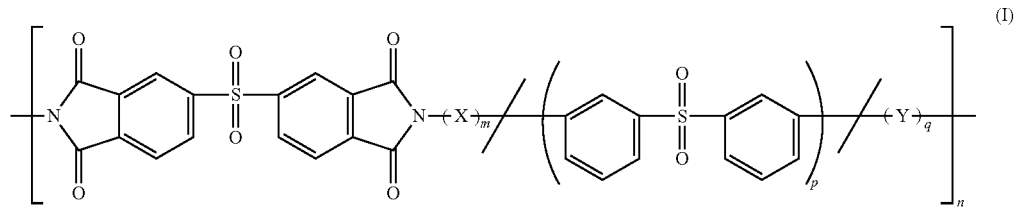

wherein X is selected from the group consisting of

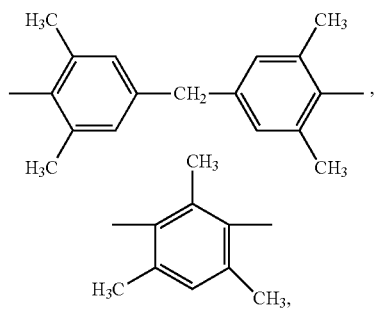

and mixtures thereof; wherein Y is

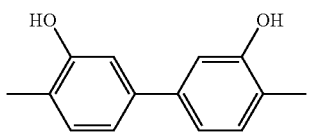

wherein p and m are independent integers from 2 to 500; q is an integer from 2 to 500;

the molar ratio of m to p is in a range of 10:1 to 1:3 and the molar ratio of p to q is in a range of 10:1 to 1:3.

19. The process of claim 18 wherein the liquid mixture comprises at least one sulfur compound in a gasoline or diesel fuel.

20. The process of claim 18 wherein the liquid mixture comprises at least one sulfur-containing compound in a naphtha hydrocarbon stream.

21. The process of claim 18 wherein said liquid mixture selected from the group consisting of: ethylacetate-ethanol, diethylether-ethanol, acetic acid-ethanol, benzene-ethanol, chloroform-ethanol, chloroform-methanol, acetone-isopropylether, allylalcohol-allylether, allylalcohol-cyclohexane, butanol-butylacetate, butanol-1-butylether, ethanol-ethylbutylether, propylacetate-propanol, isopropylether-isopropanol, methanol-ethanol-isopropanol, and ethylacetate-ethanol-acetic acid.

* * * * *